INVENTORS.
HAROLD T. STIRLING,
HARRY F. HARTZELL, JR.
BY Oscar B. Brumback
their ATTORNEY.

May 14, 1963 H. T. STIRLING ET AL 3,089,791
METHOD AND APPARATUS FOR MOISTENING DUST
Filed Feb. 26, 1962 5 Sheets-Sheet 2

INVENTORS.
HAROLD T. STIRLING,
HARRY F. HARTZELL, JR.
BY Oscar B. Brumbeck
their
ATTORNEY May 14, 1963     H. T. STIRLING ET AL     3,089,791
METHOD AND APPARATUS FOR MOISTENING DUST
Filed Feb. 26, 1962     5 Sheets-Sheet 5

INVENTORS.
HAROLD T. STIRLING,
HARRY F. HARTZELL, JR.
BY Oscar B. Brumback
their ATTORNEY.

3,089,791
Patented May 14, 1963

---

3,089,791
METHOD AND APPARATUS FOR MOISTENING DUST
Harold T. Stirling, Pittsburgh, and Harry F. Hartzell, Jr., Allison Park, Pa., assignors to Koppers Company, Inc., a corporation of Delaware
Filed Feb. 26, 1962, Ser. No. 175,851
9 Claims. (Cl. 134—18)

The present invention relates in general to an improved system especially designed and adapted to wet dust, and more particularly, the invention relates to an improved method and apparatus for moistening dust to make it free-flowing and to keep the dust from becoming air-borne. The method and apparatus are particularly applicable to finely divided dust from precipitators in waste gas cleaning systems, such as those cleaning systems associated with an open hearth furnace, a basic oxygen furnace, or a sinter plant.

Disposal of dust collected in a sintering operation has been a long-standing problem in the art. In a sintering plant, the incoming material is delivered to a pallet conveyor. Underneath the conveyor are wind-boxes which connect to a duct leading to a fan. The wind-boxes act as a collector for any dust pulled through the grate bars by the suction of the fan. The wind duct leads to a centrifugal dust collector. The purpose of the centrifugal dust collector is to remove as much dust as possible whereby wear on fan blades and fan casing is prevented, and the atmosphere is not polluted. After the dust has been collected, the disposal problem becomes apparent. The dust is extremely fine and any handling of the dust causes a cloud of dust to arise.

Open hearth electrical precipitator dust creates similar problems to those found with dust from a sintering operation. The dust from an open hearth electrical precipitator, however, is finer than the dust from a sintering operation, and thus, this dust is even more difficult to handle. For example, the dust from a sintering operation has a particle size such that more than half of the particles are less than 70 microns while the dust from an open hearth precipitator has a majority of particles that are less than 17 microns.

It has heretofore been proposed to pass dust to a sinter strand on which it is dumped so that it will undergo a sintering operation and thereby be eliminated. The dust, however, is extremely hard to handle. The dust easily becomes air-borne and thereby pollutes the atmosphere in the area of the sintering operation. It has also been suggested heretofore that the dust be moistened before it is fed to the sintering apparatus. One proposed wetting method was to deliver the dust to a pug mill where it would be agitated in the presence of water. This suggestion has not been found adequate because it is extremely difficult to moisten fine dust, and there is improper mixing in the pug mill, and in view of this improper mixing the discharged dust contains portions which are too wet for good handling while other portions are too dry. Those portions of the dust which are too dry remain subject to the same defects as the untreated dust, while those portions of the dust which are too wet do not flow properly and require an inordinate amount of heat to drive off the excess water. It has also been found that in a pug mill the agitation caused by the blades of the pug mill is too violent and this causes the dust to pollute the atmosphere in the neighborhood of the pug mill. The mixing in the pug mill rapidly wears the blades of the pug mill, and therefore, there is a high maintenance expense.

An object of the present invention, therefore, is to provide a simple, economical and facile way of handling and moistening fine dust to make it easier to handle.

The present invention provides a method and apparatus for handling and uniformly moistening dry dust. Dry precipitator dust is extremely hard to wet down, but with a slow, gentle action and sufficient retention time the dry dust may be uniformly moistened. To achieve uniform moistening of dry dust the present invention provides means by virtue of which the dust is first collected in a hopper, which is integral with the precipitator in which the dust is collected. The dust is then conveyed in a completely enclosed flight conveyor system to a closed bin wherein the dust is collected until the bin fills to a predetermined level. When the dust reaches this predetermined level in the bin, a level control mechanism automatically actuates a screw conveyor which feeds the dust from the bottom of the hopper into a drum which is automatically actuated by the level control device simultaneously with the actuation of the screw conveyor. Water sprays in the drum are also automatically started by the level control device and operate to moisten the dust so that the discharged dust contains between about 5 and 14% water. It is preferred that the dust be moistened to between 9 and 10%.

The rotary drum is operable about an axis which is slightly inclined to the horizontal and has radially extending annular baffles that project at spaced intervals along the drum, from the inner circumference of the drum toward its axis of rotation in planes at right angles to said axis, to provide for simulation in the drum of the tumbling action of a conventional disc pelletizer at repeated intervals along the drum from the feed inlet to the discharge outlet from the drum. Annular conical members are arranged on an incline from a region closer to the axis of rotation on the downstream side of each baffle to a point more remote from the axis of rotation of the drum on the upstream side of a next baffle in the direction of the discharge end of the drum.

The annular baffles are of progressively greater height along the drum from the discharge end toward the feed end, and the spacing between the baffles decreases progressively from the feed end toward the discharge end to provide for longer retention time of the fines in the areas along the drum nearer the feed end than in areas further along toward the discharge end. The annular conical member meets the annular baffle at a point remote from the axis of the drum, and these members converge together at a sharp angle to hold the dust in a vise-like grip, whereby the dust is given a positive lift. The positive lift given by the conical members in conjunction with the vertical baffles allows the wetting drum to operate at lower revolutions per minute than a conventional drum which does not have baffles and conical members.

In a conventional drum, friction, inertia, and centrifugal force are relied upon to lift the material being treated. In order to develop the required friction, inertia and centrifugal force, a conventional drum must necessarily run at a high speed, whereas by virtue of the angle formed by the conical members and baffles and the positive lift achieved thereby, it is now possible to run the drum at lower revolutions per minute. A slow speed is essential in wetting dry dust because it is necessary that the dust be treated gently. This gentle action is essential in order to ensure that the dust is homogeneously wetted, that a cloud of dust is not formed, and that the surface tension of the dust is broken down.

The wetting drum may vary in size depending on the requirements of the plant in which the drum is located, and the ratio of length of the drum to diameter is approximately 2:1. The rate of processing dust in the drum may vary from about 4 to 60 tons per hour, and the retention time of the dust in the drum will be between about one and four minutes. If the retention time is less than one minute some dry dust will be discharged, while if the retention time becomes greater than about four minutes pellets may begin to form and the water content of the discharged dust may become excessive. A retention time of two to four minutes is preferred so that the discharged dust is uniformly moistened.

Screw conveyor means for feeding dust particles to the wetting drum is disposed to feed the dust to the drum at its end having the wider spaces and the longer baffles and means for discharge of the wet dust is provided at the opposite end of the drum having the shorter baffles. The entire wetting drum can be horizontal or may be maintained at a slight incline to aid the flow of dust through the wetting drum.

This simple arrangement of baffles makes it possible for a greater proportion of the fine dry dust to reside in, and remain longer in, the entrance end areas than the areas further along toward the discharge end until it becomes more uniformly moistened. The moistened dust need not take the form of pellets or nodules, but rather becomes free-flowing and is no longer subject to the problems of dry dust. The dust passes over the baffles and in each baffle chamber the dust is moistened to a greater degree so that a decreasing amount of fine dry particles ultimately reaches the after-baffles along the drum. As a consequence, only free-flowing uniformly moistened dust reaches the discharge end of the drum.

The dust, after being moistened, may be used to provide a bed of high gas permeability, and thus when combined with the normal feed to a sintering apparatus, this bed of moistened dust is suitable for high speed sintering to produce a rigid, firm, dust-free product. The dust is advantageously used in sintering apparatus such as disclosed in my U.S. Patent No. 2,920,344, issued January 12, 1960.

The following description of the preferred embodiment of the invention is described with reference to the accompanying drawings in which:

FIGURE 3 is a side elevation view of the dust wetting drum showing the arrangement of the sprays therein and taken along lines III—III of FIGURE 4a;

FIGURE 4 is a side elevation view of the dust wetting drum showing the arrangement of the scrapers therein and taken along lines IV—IV of FIGURE 4a;

FIGURE 4a is an end elevation view of the dust wetting drum taken along lines IV—IV of FIGURES 3 and 4;

Figure 1:
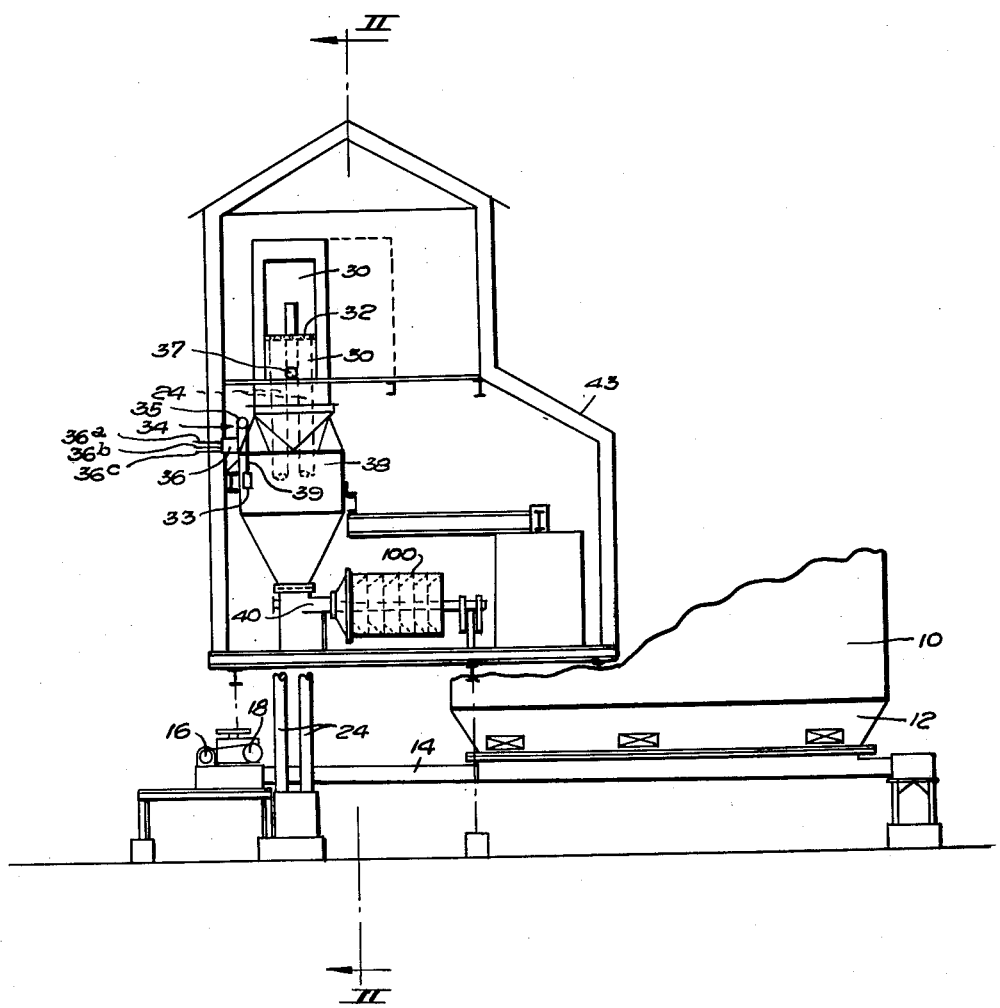
FIGURE 1 is a side elevational view of the apparatus.
Figure 2:
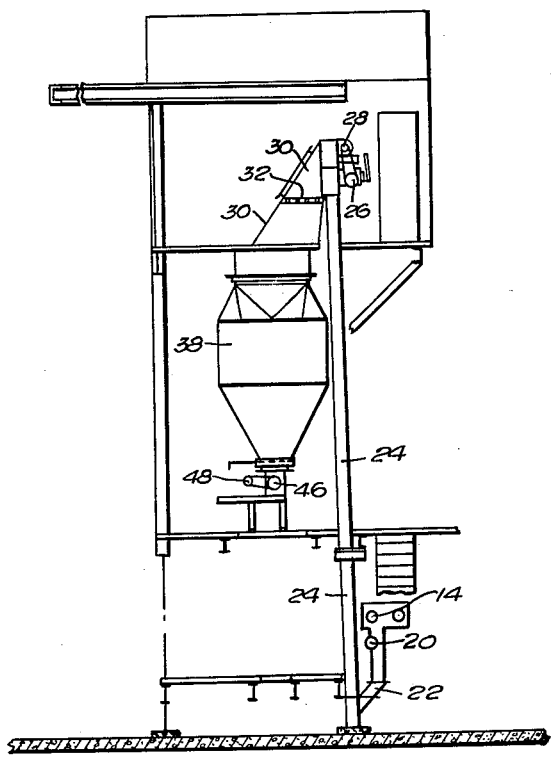
FIGURE 2 is a cross-sectional view taken along line II—II of FIGURE 1.

Referring to the drawings, precipitator 10 collects airborne dust which has been evolved in a sintering plant or other system. The dust is scraped from precipitator 10 and collected in an integral elongated hopper 12. The collected dust is passed horizontally by a completely enclosed flight conveyor 14 to conduit 22. Conveyor 14 is operated by motor 16 and drive 18. Conduit 22 has valve 20 therein which valve prevents the drawback of air into the precipitator which is under suction. The dust then passes through conduit 22 to the intake end of another completely enclosed flight conveyor 24, which is operated by motor 28 and drive 26.

The dust passes from the exit end of the conveyor 24 through chute 30 and into surge bin 38 at the rate of about 4–20 pounds per minute. Screen 32 is placed in chute 30 to prevent any large pieces of foreign matter from entering the surge bin. This foreign matter may consist, for example, of broken flights from the conveyor 24.

The surge bin 38 is provided with a level control means 34. While any conventional level control means may be used, the level control means illustrated herein comprises, for example, a weight 33 suspended in the bin 38 by a cable 39, which cable 39 passes over a pulley wheel 35. An automatic drive mechanism 36 (shown schematically) lowers the weight into the bin. When the weight strikes the top of the bed of material in the bin the slackening of the cable automatically stops the mechanism which then interprets the level within the bin in terms of the length of cable laid out. The automatic drive mechanism then raises the weight and repeats the process making a reading each time.

The level control is electrically connected through lines 36a, 36b, and 36c to the material handling equipment. Line 36a is operable when the level in the surge bin 38 reaches a predetermined high level. In similar manner lines 36b and 36c are operable at predetermined intermediate and low levels, respectively. The control system is wired to automatically actuate drum 100, screw conveyor 40, and water sprays 121 when the predetermined intermediate level is reached. The drum 100, screw conveyor 40, and water sprays 121 are stopped when the predetermined low level is reached. If the level in the surge bin reaches the emergency high level, the two conveyors 14 and 24 are stopped automatically and the valve 20 is closed while the remainder of the apparatus continues to operate until the bin is emptied to the low level. From surge bin 38, the dust enters screw conveyor 40 and then passes into chamber 133b of rotary drum 100. The dust is sprayed with water in chambers 133c, 133d, 133e, 133f, 133g and 133h of drum 100 in order to moisten the dust. The surge bin 38, screw conveyor 40 and dust wetting drum 100 are all located in housing 43.

Figure 3:
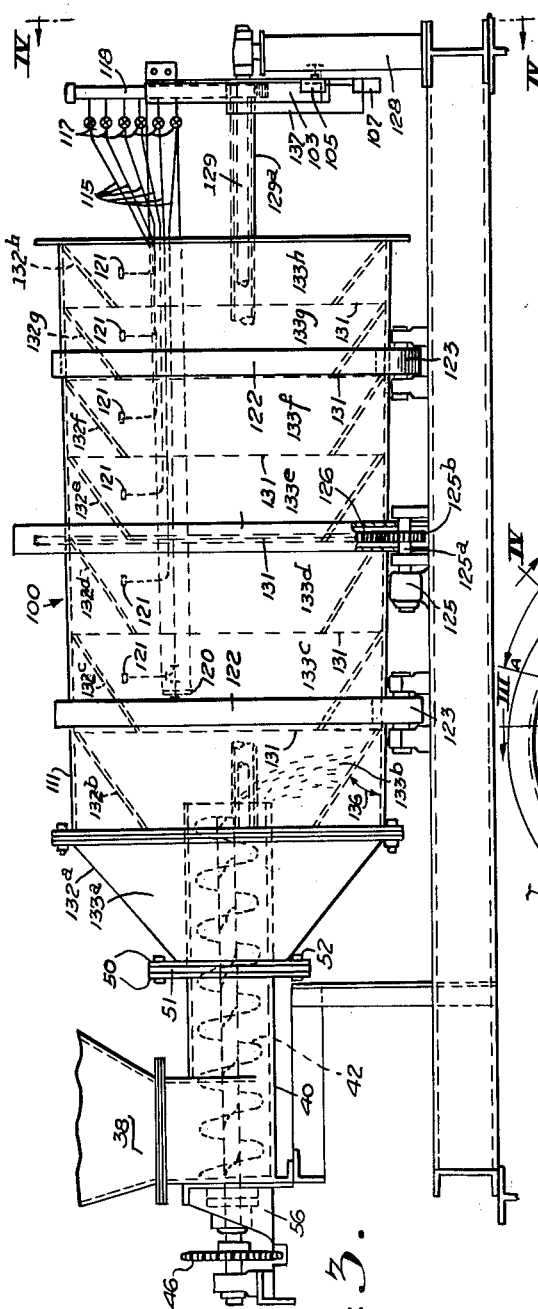
Figure 4:
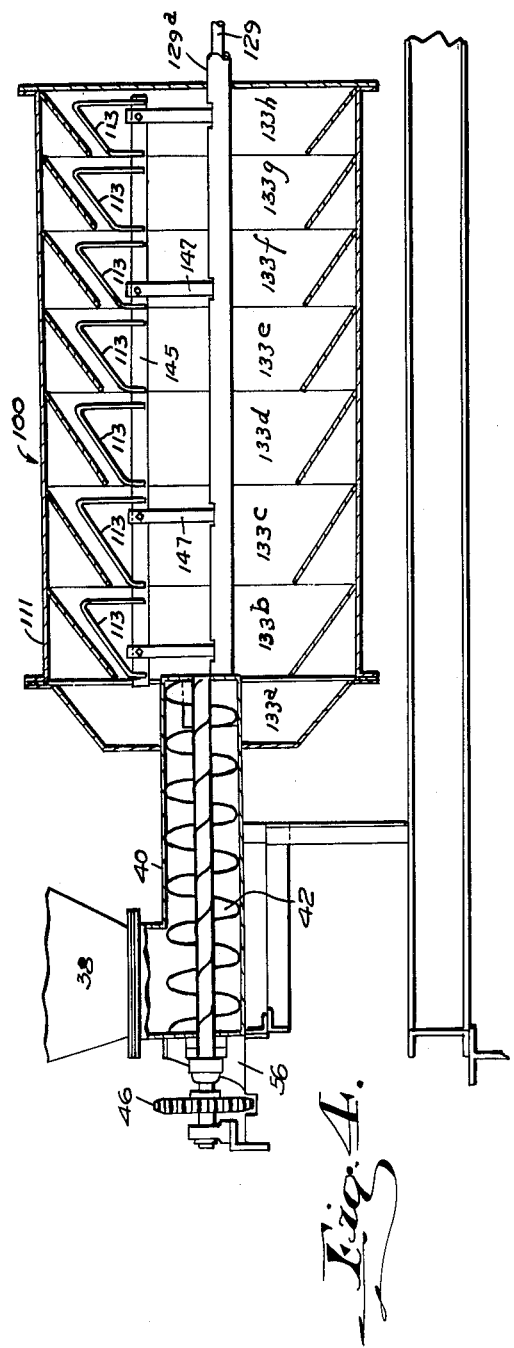

The screw conveyor 40 and wetting drum 100 are shown in detail in FIGURES 3 and 4. The screw conveyor 40 has therein a screw 42 mounted on a shaft 44. The shaft is driven by motor 48 and variable speed drive means 46, and the intake end of the screw conveyor is closed by bracket means 56 which is removable for cleaning of the screw.

Dust wetting drum 100 is attached to conveyor 40 by a pair of flanges 50 and a rubber seal 51. The flanges 50 and seal 51 are fastened by bolts 52 to provide a dust seal and to allow easy separation of the two pieces for dismantling and cleaning.

The wetting drum rotates on idler rolls 123 operating on bands 122 and the drum is driven by motor 125, shaft 125a and drive means 125b, 126. The drum 100 comprises a cylindrical shell 111, scrapers 113, baffles 131, and a plurality of conical members 132. Baffles 131 and conical members 132 rotate with the drum 100, while the scrapers 113 are movable only through a short distance, A–B, as shown in FIGURE 3. The baffles 131 and conical members 132 form chambers 133a, 133b, 133c, 133d, 133e, 133f, 133g and 133h within the drum 100.

In accordance with the present invention, the baffles 131 are arranged so that they increase in height about one-half inch each progressively from the discharge outlet end of the drum 100 to the feed inlet end of the drum and the baffles 131 are spaced apart from each other lengthwise of the drum 100 in progressively decreasing amounts, such as those indicated on the drawing, from the feed inlet end to the discharge outlet end. The angle of inclination 136 at which the conical members 132 are set in relation to the shell 111 of the drum is between 25° and 50°. With this arrangement of these parts, the development of moistened dust of the desired flow characteristics is maintained without leaving any dry dust at the outlet end of the drum 100.

The drum is also provided with a plurality of fine mist spray nozzles 121 located in each of the baffle chambers 133c, 133d, 133e, 133f, 133g and 133h. The spray nozzles 121 are supplied from manifold pipe 118 by water lines 115 having valves 117 therein. The manifold pipe is in turn fed by water line 103 having therein a pressure regulator 105 and a filter 107. The water lines 115 are supported by support 120 which is a channel bar extending from baffle chamber 133c to water manifold pipe 118.

The screw conveyor 40 feeds dry dust into the second baffle chamber 133b. It is necessary to feed to the second baffle chamber because it has been found that if the dry dust is fed into chamber 133a, the dust leaks out through the front end at dust seal 50, 51.

The scrapers 113 are mounted upon support pipe 129, which in turn is supported by member 128. The movement of scrapers 113 is limited in order to avoid their hitting the spray pipes or nozzles 115, 121. The limitation of movement of the scrapers is achieved by a counterweight 139 attached to scraper support pipes 129 and 129a by bracket 135 and arm 137. Stops 141, 143 are also provided to limit the movement of the counterweight arm 137 and thereby to limit the movement of scrapers 113. No water sprays are provided in baffle chambers 133a and b, because any water sprayed into these chambers would tend to plug the conveyor 40.

Support pipes 129, 129a are mounted off the center of the axis of drum 100. This off-center arrangement allows the scraper to move from position B to position A upon the buildup of material on the inside of members 132 and 131. As the scrapers move from position B to position A, the distance between scraper member 113 and the inside of conical members 132 increases. It will be apparent, therefore, that the drum will not be subject to a sudden stoppage because of a buildup of material and jamming of the scrapers on the material. When the scrapers are in position A, the counterweight 139 will operate to forcefully contact the scrapers with the buildup material on the inside of conical members 132. In this manner, it is possible to slowly scrape off the buildup until it has been reduced in size, and the scraper member 113 returns to position B.

The dust, after being moistened, is discharged from the wetting drum through discharge chute 134. The moistened dust is then deposited on a discharge conveyor (not shown) from whence it may be delivered to a suitable operation such as a sinter operation.

Figure 5:
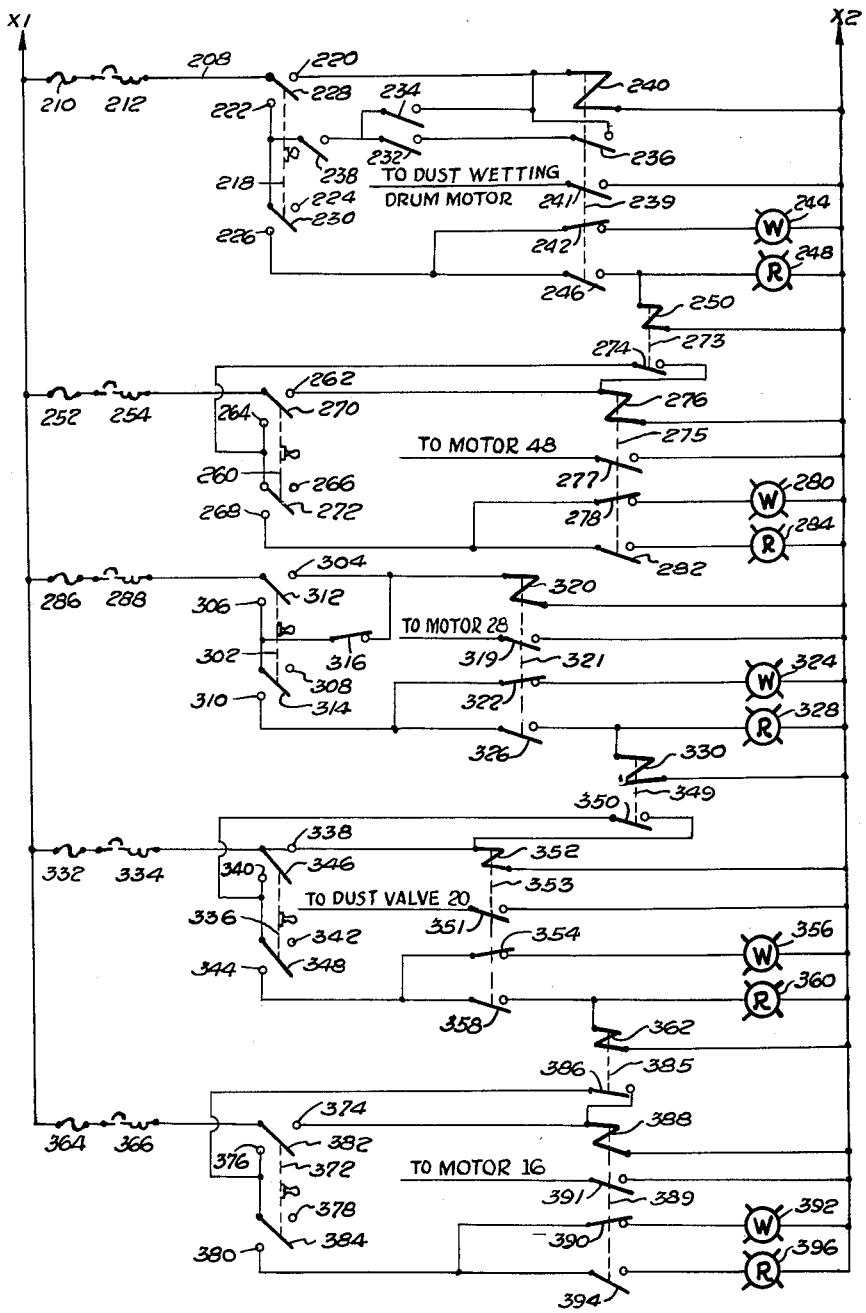
FIGURE 5 is a circuit diagram showing the automatic control system.

Automatic operation of the apparatus may be achieved by the electrical system shown in FIGURE 5, leads X1, X2 connect with a suitable source of power, such as a 110 volt alternating current source. Fuse 210 and overload circuit breaker 212 are placed in line 208 to break the circuit upon a voltage increase. Double pole, double throw switch 218 is operable to either by-pass the automatic control system in order to manually actuate the wetting drum 100 or to set the automatic control circuit into operation. The manual by-pass of the automatic control circuit is achieved by contacting poles 228 and 230 with contacts 220 and 224. When poles 228 and 230 are in contact with contacts 222 and 226, the automatic control circuit is in position to operate. With the double pole, double throw switch 218 in position for automatic control current runs through normally closed switch 242 thereby lighting white bulb 244. Each of the bulbs shown in FIGURE 5 are located on a control panel. A lit white bulb indicates that the circuit is ready to operate.

At the start of operation, the surge bin is empty. As the surge bin begins to fill, the low level indicator 36c on the level control meter actuates switch 232. Each of the switches, such as 232, 234, etc., is automatically actuated and may be, for example, solenoid or mechanically actuated switches. As the surge bin 38 continues to fill, the collected dust reaches a predetermined intermediate level, at which time, the intermediate level indicator 36b on the level control means 34, automatically closes switch 234. Automatically actuated switch 238 is closed when the discharge conveyor from the dust wetting drum is operating and open when the discharge conveyor is not operating. Assuming the discharge conveyor to be in operation and switch 238 in the closed position, when the predetermined intermediate level is reached and switch 234 is closed, as aforesaid, the starter contactor coil 240 is automatically actuated thereby raising shaft 239. Starter contactor 240 has four functions. It closes switch 236, energizes the dust wetting drum motor by closing switch 241, opens switch 242 and closes switch 246. When switch 242 is opened, white light 244 is turned off, and the closing of switch 246 simultaneously turns on red light 248 on the control panel. Red light 248 indicates that the dust wetting drum motor is in operation. The closing of switch 246 also actuates relay control coil 250 which in turn closes switch 274. The purpose for closing switch 236 by starter contactor 240, will become apparent hereinafter.

Line 251 is provided with a fuse 252 and circuit breaker 254. There is also provided a double pole, double throw switch 260 which is operable when arms 270 and 272 are in contact with contacts 262, 266 to manually control this portion of the circuit which actuates the screw conveyor motor 48, and when arms 270, 272 are contacting contacts 264, 268, the circuit provides for automatic control of the screw conveyor motor 48. When the double pole, double throw switch 260 is in position on automatic control and the motor 48 is not in operation, contact switch 278 is in its normally closed position, thereby lighting white bulb 280, which indicates that the screw conveyor motor 48 is not operating.

As set forth above, when starter contactor 240 is actuated, it automatically closes switch 246 thereby actuating relay control coil 250 which in turn raises shaft 273 thereby closing switch 274. The closing of switch 274 actuates starter contactor coil 276 to raise shaft 275 which performs three functions, closing switch 277, opening switch 278, and closing switch 282. Opening switch 278 turns off the white bulb 280 on the control panel, and closing switch 282 turns on red bulb 284, indicating that the screw conveyor is in operation. When switch 277 is closed, power is passed to motor 48 thereby actuating the screw conveyor 40.

Line 285 includes fuse 286 and overload circuit breaker 288. The circuit further includes a double pole, double throw switch 302, which is operable for manual control when poles 312, 314 are contacting contacts 304, 308, and when poles 312, 314 contact contacts 306, 310, automatic control is provided for conveyor motor 28. When the double pole, double throw switch is in position for automatic control of the circuit, switch 316 is normally closed, thereby actuating starter contactor coil 320 to raise shaft 321. Starter contactor 320 having been actuated, switches 319 and 326 are closed and switch 322 is opened. By closing switch 326 and opening switch 322 the red bulb 328 on the control board is turned on, while the white bulb 324 is turned off. The red light indicates that conveyor 24 is operating. Closed switch 319 sends current through conveyor motor 28.

If the dust in the surge bin 38 reaches an emergency high level, the high level indicator 36a of the level control 34 automatically opens switch 316, which deactivates starter contactor 320 which in turn lowers shaft 321 thereby closing switch 322 and opening switches 319 and 326. Closing switch 322 and opening switch 326 results in the red light 328 being turned off and the white light 324 being turned on to indicate that the conveyor 24 is not operating. The opening of switch 319 results in shutting off the conveyor 24 so that the surge bin does not overflow. The opening of switch 326 also deactivates control relay coil 330, which lowers shaft 349 and in turn opens switch 350.

Line 331 includes fuse 322 and overload circuit breaker 334. This circuit also includes a double pole, double throw switch 336 which is operable for manual control when poles 346, 348 are in contact with contacts 338, 342, and operable for automatic control when poles 346, 348 are in contact with contacts 340, 344. In operation, switch 350 is closed and thereby starter contactor coil 352 is actuated. Actuation of starter contactor 352 raises shaft 353 which opens switches 351 and 354, and closes switch 358. Closed switch 358 turns on red bulb 360 on the control panel, while white bulb 356 is turned off by virtue of the open switch 354. The red light indicates that the dust valve is open. As stated above, when the level in the surge bin reaches an emergency high level the high level indicator 36a on the lever control device 34 is actuated, switch 316 is opened thereby opening switch 326 and deactuating control relay 330, thereby opening switch 350. The opening of switch 350 deactivates starter contactor coil 352, which lowers shaft 353 which in turn closes switch 354, opens switches 351 and 358. The opening of switch 351 closes dust valve 20. The closing of switch 354 turns on white light 356, whereby it is indicated that the dust valve is closed. The opening of switch 358 turns off the red light 360, and, in addition, deactivates control relay 362, which in turn opens switch 386.

Line 363 includes a fuse 364 and overload circuit breaker 366. The circuit further includes a double pole, double throw switch 372, which is operable for manual control when poles 382, 384 contact contacts 374, 378, and operable for automatic control when poles 383, 384 contact contacts 376, 380. With double pole, double throw switch in position for automatic control and in operation switch 386 is closed, thereby actuating starter contactor coil 388, which in turn maintains switch 390 in the open position and switches 391 and 394 in the closed position. Switch 391 being in the closed position, the conveyor motor 16 is operating. Switch 390 being open, maintains the white light 392 on the control panel in the off position and switch 394 being closed, keeps the red light 396 on the control panel lit, thereby indicating that the enclosed flight conveyor 14 is in operation. When control relay 362 is deactuated by virtue of the opening of switch 358, shaft 385 is lowered and switch 386 is opened, as aforesaid, and thereby starter contactor coil 388 is deactuated. Deactuation of starting contactor 388 lowers shaft 389 to open switch 391 and stop the conveyor motor 16. The lowering of shaft 389 also closes switch 390, thereby lighting white bulb 392 on the control board, and opens switch 394, thereby turning off the red light 396 on the control board.

As the surge bin begins to empty, the level in the surge bin goes below the predetermined intermediate level and thereby the intermediate level indicator 36b of the level control means 34 opens switch 234. The opening of this switch, however, does not deactivate starter contactor 240 because the parallel circuit of switches 232 and 236 remains closed. When, however, the level in the surge bin drops to the predetermined low level, then the low level indicator 36c of the level control means 34 opens switch 232. At this point, starter contactor coil 240 is deactivated, thereby opening switch 241 to shut off the dust wetting drum motor 125, closing switch 242 and opening switch 246. By virtue of the closing of switch 242 and the opening of switch 246, the white light 244 on the control panel is turned on and the red light 248 is turned off, thereby indicating that the dust wetting drum is not in operation. The opening of switch 246 also deactivates control relay coil 250 which opens switch 274. This, in turn, deactivates starting contactor coil 276 which opens switch 277 to turn off the screw conveyor motor 48 and simultaneously opens switch 282 and closes switch 278, thereby turning on the white light 280 and turning off the red light 284 to indicate that the screw conveyor is not operating.

When the level in the surge bin again drops to the low level, as indicated by the low level indicator 36c of the level control means 36c, switch 316 is automatically closed, thereby actuating starter contactor coil 320, which closes switch 319 to actuate the conveyor 24, and also opens switch 322 and closes switch 326. This turns off white bulb 324 on the control panel and turns on red bulb 328, thereby indicating that the conveyor 24 is again operating. The closing of switch 326 also activates control relay coil 330 which closes switch 350 and activates starter contactor coil 352, which closes switch 351 to open the dust valve 20. Activation of starter contactor coil 352 also opens switch 354, thereby turning off white bulb 356 and closes switch 358, thereby lighting red bulb 360, whereby it is indicated that the dust valve is again open. The closing of switch 358 also actuates control relay 362, which closes switch 386, which in turn actuates starter contactor coil 388, which closes switch 391 to start motor 16. Actuation of starter contactor coil 388 also opens switch 390, thereby turning off white bulb 392, and closes switch 394, thereby lighting red bulb 396 to indicate that the conveyor 14 is operating.

As an example of the operation of the embodiment illustrated in the drawings, the precipitator 10 collected dust which had been evolved in a sintering plant. A sample of the dust was taken, and a chemical analysis was run to determine the composition of the dust. The major metallic constituents of the dust were: ferrous iron—22%; ferric iron—43.2%; calcium—2.2%; lead—1% and zinc—1.4%. A screen analysis was also run on the sample and showed the following results.

| U.S. Standard Screen: | Percent |
| --- | --- |
| On 20 mesh | 2.2 |
| On 30 mesh | 0.4 |
| On 50 mesh | 0.7 |
| On 100 mesh | 2.7 |
| On 200 mesh | 33.3 |
| On 325 mesh | 54.4 |
| Through 325 mesh | 5.8 |

The dust was scraped from precipitator 10 and collected in hopper 12. The collected dust was passed through flight conveyor 14 to conduit 22 and then through conveyor 24 and chute 30, and the dust was collected in surge bin 38. The conveyor discharged approximately 10 lbs. of dust/min. to the surge bin 38. After four hours, approximately 2500 lbs. of dust had collected in the surge hopper. At this point, the level in the surge bin 38 reached a predetermined intermediate level and the level control device actuated the drum 100, screw conveyor 40 and fogging water sprays 121. Dust was fed from the surge hopper into the wetting drum 100 at the rate of approximately 180 lbs./min. The drum operated for about nine minutes, at which time, a predetermined low level was reached and the drum, the screw conveyor and water sprays were automatically shut off. During the nine minutes of operation, sufficient water was fogged into the wetting drum to wet the dust to approximately 9% water. The drum used in this instance was 3 ft. 3 in. in diameter, 6 ft. in length and rotated at the speed of 7.5 r.p.m. The retention time of the dust in the drum was approximately two minutes. A water line pressure of 150 p.s.i.g. was used and the discharged dust from the wetting drum was uniformly moistened. A sample of the discharge dust was tested and found to have a screen analysis as follows.

| U.S. Standard Screen: | Percent |
| --- | --- |
| On 20 mesh | 22 |
| On 30 mesh | 43 |
| On 40 mesh | 30 |
| Through 40 mesh | 5 |

We claim:

1. Automatic apparatus for improving the flow properties of electrical precipitator dust comprising hopper means for collecting dry dust, a surge bin for storing dry dust, a first completely enclosed conveyor means operable to deliver said dry dust from said hopper to said surge bin, a dust wetting drum having a plurality of water sprays therein, a second completely enclosed conveyor means for delivering dry dust from said surge bin to said dust wetting drum, a level detecting device operatively associated with said surge bin and adapted to detect predetermined low, intermediate, and high levels in said surge bin, an automatic control means operatively associated with said level detecting device to automatically actuate said dust wetting drum, said water sprays and said second completely enclosed conveyor means when said predetermined intermediate level is reached, to automatically stop said first completely enclosed conveyor means when said predetermined high level is reached, and to stop said dust wetting drum, said water sprays and said second completely enclosed conveyor means when said predetermined low level is reached, said dust wetting drum comprising a substantially horizontally aligned cylindrical shell mounted for rotation about its longitudinal axis, radially extending annular baffles projecting inwardly at spaced intervals along the drum from the inner circumference thereof towards its longitudinal axis of rotation, conical members connecting the axial portion of each annular baffle with the circumferential portion of the next adjacent downstream annular baffle, said annular baffles in conjunction with said conical members forming a plurality of chambers within said cylindrical outer shell, the number of chambers being designated by $n$, wherein $n$ is a numeral having a value of 3 to 15, a scraper member mounted within each of $n-1$ chambers, wherein the chamber which is not provided with a scraper member is that chamber at the upstream end of the drum, and a water spray located in each of $n-2$ chambers, wherein the two chambers which are not provided with water spray means are the chambers at the upstream end of the drum.

2. A method for improving the flow properties of dust comprising feeding said dust to a surge bin, automatically actuating a conveyor means when said surge bin reaches a predetermined level thereby conveying said dust to a dust wetting drum, fogging water into said dust wetting drum whereby said dust is moistened, subjecting said dust in said dust wetting drum to a plurality of tumbling actions and discharging free-flowing dust containing from 5–14% water from said dust wetting drum.

3. The method of claim 2 wherein said dust is retained in said zone for from two to four minutes and the discharged free-flowing dust contains from 9–10% water.

4. Dust wetting apparatus comprising a first completely enclosed conveyor means, hopper means for collecting dry dust, a surge bin for storing dry dust, said first completely enclosed conveyor means operable to deliver said dry dust from said hopper to said surge bin, a dust wetting drum having water sprays therein, a second completely enclosed conveyor means for delivering dry dust from said surge bin to said dust wetting drum, a level detecting device operatively associated with said surge bin, and automatic control means operable upon actuation of said level detecting device to automatically start said wetting drum, said water sprays and said second completely enclosed conveyor means when a predetermined level is reached in said surge bin.

5. Dust wetting apparatus comprising conveyor means to transport dust from an electrical precipitator to a surge bin, a dust wetting drum, and a conveyor for transporting said dry dust from said surge bin to said dust wetting drum, said dust wetting drum comprising a substantially horizontally aligned cylindrical shell mounted for rotation about its longitudinal axis, radially extending annular baffles projecting inwardly at spaced intervals along the drum from the inner circumference thereof towards its longitudinal axis of rotation, conical members connecting the axial portion of each annular baffle with the circumferential portion of the next adjacent downstream annular baffle, said annular baffles in conjunction with said conical members forming a plurality of chambers within said cylindrical outer shell, the number of chambers being designated by $n$, wherein $n$ is a numeral having a value of 3 to 15, a scraper member mounted within each of $n-1$ chambers, wherein the chamber which is not provided with a scraper member is that chamber at the upstream end of the drum, and a water spray located in each of $n-2$ chambers, wherein the two chambers which are not provided with water spray means are the chambers at the upstream end of the drum.

6. A dust wetting drum comprising a substantially horizontally aligned cylindrical shell mounted for rotation about its longitudinal axis, radially extending annular baffles projecting inwardly at spaced intervals along the drum from the inner circumference thereof towards its longitudinal axis of rotation, conical members connecting the axial portion of each annular baffle with the circumferential portion of the next adjacent downstream annular baffle, said annular baffles in conjunction with said conical members forming a plurality of chambers within said cylindrical outer shell, the number of chambers being designated by $n$, wherein $n$ is a numeral having a value of 3 to 15, a scraper member mounted within each of $n-1$ chambers, wherein the chamber which is not provided with a scraper member is that chamber at the upstream end of the drum, and a water spray located in each of $n-2$ chambers, wherein the two chambers which are not provided with water spray means are the chambers at the upstream end of the drum.

7. A dust wetting drum comprising a substantially horizontally aligned cylindrical shell mounted for rotation about its longitudinal axis, said cylindrical shell having a length and a diameter, the ratio of said length to said diameter being approximately 2:1, a plurality of radially extending annular baffles projecting inwardly at spaced intervals along the drum from the inner circumference thereof towards its longitudinal axis of rotation, conical members connecting the axial portion of each annular baffle with the circumferential portion of the next adjacent downstream annular baffle, said annular baffles in conjunction with said conical members forming a plurality of chambers within said cylindrical shell, scraper members and water sprays located in said chambers, and drive means to rotate said dust wetting drum about its longitudinal axis.

8. Automatic apparatus for improving the flow properties of electrical precipitator dust comprising hopper means for collecting dry dust, a surge bin for storing dry dust, a first completely enclosed conveyor means operable to deliver said dry dust from said hopper to said surge bin, a dust wetting drum having a plurality of water sprays therein, a second completely enclosed conveyor means for delivering dry dust from said surge bin to said dust wetting drum, a level detecting device operatively associated with said surge bin and adapted to detect predetermined low, intermediate, and high levels in said surge bin, automatic control means operatively associated with said level detecting device to automatically actuate said dust wetting drum, said water sprays and said second completely enclosed conveyor means when said predetermined intermediate level is reached, to automatically stop said first completely enclosed conveyor means when said predetermined high level is reached, and to stop said dust wetting drum, said water sprays and said second completely enclosed conveyor means when said predetermined low level is reached.

9. A method for improving the flow properties of electrical precipitator dust comprising collecting dry dust, automatically transporting said dust to storage in a bin, automatically transporting said dust from said bin to a tumbling zone, automatically spraying water into said tumbling zone the dust being transported to said tumbling zone when said dust reaches a predetermined intermediate level in said bin, said spraying of water being automatically started when said dust reaches said predetermined level and said bin and said transportation of said dust to said tumbling zone and said spraying of water being automatically stopped when the level in said bin reaches a predetermined low level.

References Cited in the file of this patent

UNITED STATES PATENTS

| 1,207,512 | Dickson | Dec. 5, 1916 |
| 1,251,073 | Maloney | Dec. 25, 1917 |
| 2,427,388 | Curran | Sept. 16, 1947 |